(12) United States Patent
Wada et al.

(10) Patent No.: US 8,833,938 B2
(45) Date of Patent: Sep. 16, 2014

(54) PROGRESSIVE-POWER SPECTACLE LENS DESIGN METHOD

(75) Inventors: Osamu Wada, Ina (JP); Tadashi Kaga, Minowa-machi (JP)

(73) Assignee: Hoya Lens Manufacturing Philippines Inc., Cavite (PH)

( * ) Notice: Subject to any disclaimer, the term of this patent is extended or adjusted under 35 U.S.C. 154(b) by 0 days.

(21) Appl. No.: 13/230,655

(22) Filed: Sep. 12, 2011

(65) Prior Publication Data

US 2012/0062837 A1     Mar. 15, 2012

(30) Foreign Application Priority Data

Sep. 14, 2010 (JP) .................................. 2010-205312

(51) Int. Cl.
    *G02C 7/02*         (2006.01)
    *G02C 7/06*         (2006.01)
(52) U.S. Cl.
    CPC ............... *G02C 7/065* (2013.01); *G02C 7/024* (2013.01); *G02C 7/061* (2013.01); *G02C 2202/08* (2013.01); *G02C 7/027* (2013.01)
    USPC ................................ 351/159.77; 351/159.42
(58) Field of Classification Search
    USPC ............. 351/159.01, 159.06, 159.41–159.43, 351/159.58, 159.73–159.79
    See application file for complete search history.

(56) References Cited

U.S. PATENT DOCUMENTS

| 4,838,674 A |   | 6/1989 | Dufour ..................... 351/169 |
| 5,272,495 A | * | 12/1993 | Pedrono .................. 351/159.42 |
| 5,949,519 A |   | 9/1999 | Le Saux et al. |
| 7,997,726 B2 |   | 8/2011 | Drobe et al. |

FOREIGN PATENT DOCUMENTS

| EP | 0911673 A1 | 4/1999 |
| JP | 54-085743 | 7/1979 |
| JP | 64-032227 | 2/1989 |
| WO | 2007068819 A1 | 6/2007 |

OTHER PUBLICATIONS

Extended European search report dated Jan. 19, 2012 issued in corresponding European application 11180874.7 cites the foreign patent documents above.

* cited by examiner

*Primary Examiner* — Scott J Sugarman
*Assistant Examiner* — Robert E Tallman
(74) *Attorney, Agent, or Firm* — DLA Piper LLP (US)

(57) ABSTRACT

A progressive-power spectacle lens design method, the progressive-power spectacle lens including a distance portion, a near portion, and a progressive portion provided between the distance portion and the near portion, the method comprising: decreasing a distance along a principal meridian from a fitting point to a progression start point and increasing a length of a progressive corridor defined by the progression start point and a progression end point when addition power is large, whereas increasing the distance along the principal meridian from the fitting point to the progression start point and decreasing the length of the progressive corridor when the addition power is small, wherein the distance from the fitting point to the progression end point is fixed irrespective of the addition power.

4 Claims, 2 Drawing Sheets

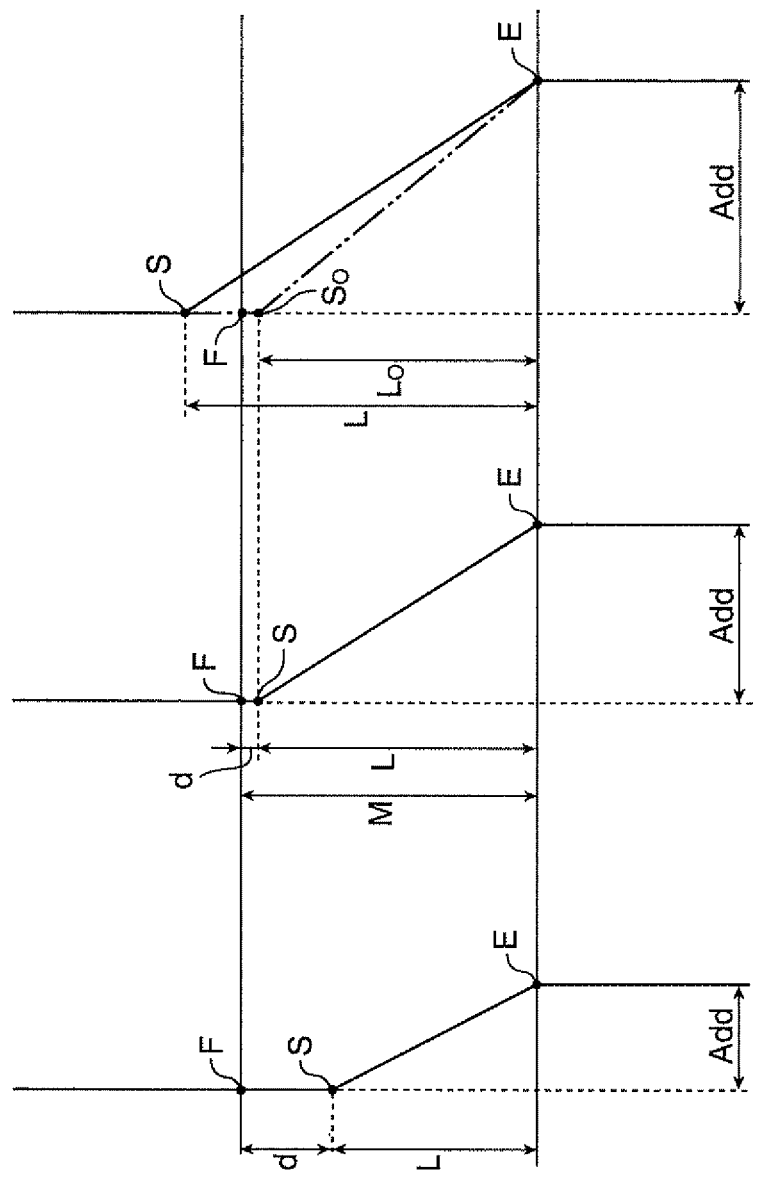

PROGRESSIVE-POWER SPECTACLE LENS DESIGN METHOD

This application claims priority to Japanese Patent Application No. 2010-205312, filed Sep. 14, 2010, the entirety of which is hereby incorporated by reference.

BACKGROUND

1. Technical Field

The present invention relates to a progressive-power spectacle lens design method including a distance portion having power corresponding to distant vision, a near portion having power corresponding to near vision, and a progressive portion provided between the distance portion and the near portion.

2. Related Art

Spectacle lenses are either single-vision spectacle lenses or progressive-power spectacle lenses.

A progressive-power spectacle lens is, for example, an aspheric lens including a distance portion having power (dioptric power) corresponding to distant vision, a near portion having power corresponding to near vision, a progressive portion provided between the distance portion and the near portion, and intermediate side portions provided on both sides of the progressive portion.

The progressive portion provided between the distance portion and the near portion has a progressive surface where addition power continuously changes between a progression start point and a progression end point along a principal meridian that is a collection of points through which the line of sight frequently passes when the lens is worn by a wearer.

Known progressive-power spectacle lenses of related art have a variety of relationships between the length of a progressive corridor, which is defined by the progression start point and the progression end point, and addition power, which is the difference in power between the distance portion and the near portion.

In an example of related art (JP-A-54-85743), a progressive corridor is provided between a progression start point, which is the boundary between a progressive portion and a distance portion, and a progression end point, which is the boundary between the progressive portion and a near portion, and the length of the progressive corridor is set to be longer for greater addition power. In another example of related art (JP-A-64-32227), the distance from the intersection of the boundary between a distance portion and an intermediate portion and a principal meridian to a progression start point on the principal meridian and the length of a progressive corridor are set to be shorter for greater addition power.

In the related art described in JP-A-54-85743, since the lens is so designed that the line of sight passes through the boundary between the progressive portion and the distance portion when the spectacle wearer views an object in front thereof, the spectacle wearer, when moving the line of sight from the distance portion through the progressive portion to the near portion, experiences change in dioptric power at a point on the boundary through which the line of sight passes when the spectacle wearer views an object in front thereof.

The change in dioptric power at a point on the boundary causes the spectacle wearer, if the wearer has been using the progressive-power spectacle lens only for a short period, to feel uncomfortable. As a result, the spectacle wearer will not become readily accustomed to the progressive-power spectacle lens or will feel difficult to use the lens.

In the related art described in JP-A-64-32227, the lens is so designed that the length of the progressive corridor is set to be shorter for greater addition power or changed in inverse proportion to the magnitude of addition power. In the related art described in JP-A-64-32227, when the spectacle wearer is in an advanced stage of presbyopia and requires greater addition power, the change in addition power needs to be greater across the same length of the progressive corridor or the rate of change in addition power needs to be sharply increased. As a result, the spectacle wearer will experience eye fatigue or feel difficult to use the lens.

SUMMARY

An advantage of some aspects of the invention is to provide a progressive-power spectacle lens design method that provides both a wearer who first uses a progressive-power spectacle lens and a wearer who are in an advanced stage of presbyopia with excellent usability.

An aspect of the invention is directed to a progressive-power spectacle lens design method, the progressive-power spectacle lens including a distance portion, a near portion, and a progressive portion provided between the distance portion and the near portion, a power of the lens changing along a principal meridian between a progression start point provided at a distance-portion-side end of the progressive portion and a progression end point provided at a near-portion-side end of the progressive portion. The method includes decreasing a distance along the principal meridian from a fitting point to the progression start point and increasing a length of a progressive corridor defined by the progression start point and the progression end point when addition power is large, whereas increasing the distance along the principal meridian from the fitting point to the progression start point and decreasing the length of the progressive corridor when the addition power is small. The distance from the fitting point to the progression end point is fixed irrespective of the addition power.

The distance portion is a portion having first power and typically refers to a portion having power corresponding to distant vision. In the aspect of the invention described above, the distance portion may not be a portion having power corresponding to distant vision but may alternatively be a portion having power that allows a wearer to view an object at an intermediate distance or a portion having power that corresponds to near vision and allows the wearer to view a near object.

In the configuration described above, for a person who wears a progressive-power spectacle lens for the first time, the lens is so designed that the rate of change in addition power of the lens is small and the distance along the principal meridian from the fitting point, through which the line of sight passes when the wearer views an object in front thereof, to the progression start point is large. In this way, the field of view around the fitting point does not include the portion where the dioptric power changes, whereby a wide field of view for distant vision similar to that of a single-vision lens can be provided and hence the wearer who uses a progressive-power spectacle lens for the first time will not feel uncomfortable and will be quickly accustomed to the progressive-power spectacle lens. Further, since the rate of change in addition power is small, the amount of astigmatism is small and the wearer will not experience eye fatigue in many cases.

On the other hand, when the wearer who has been accustomed to the progressive-power spectacle lens needs greater addition power and switches to a typical progressive-power spectacle lens, which has addition power progressively changing immediately from the fitting point in many cases, the wearer can readily switch to a typical progressive-power spectacle lens because the progression start point approaches the fitting point as the addition power is increased in the above aspect of the invention.

When a person who is in an advanced stage of presbyopia wears a progressive-power spectacle lens, the addition power is large and hence the length of the progressive corridor is designed to be long. As a result, the rate of change in addition power will be moderate, whereby the wearer will not experience eye fatigue. Further, since a person who is in an advanced stage of presbyopia is, unlike a person who wears a progressive-power spectacle lens for the first time, accustomed to wearing a progressive-power spectacle lens, the wearer will not feel uncomfortable even when the progression start point is located close to the fitting point.

Since the progressive-power spectacle lens described above is so designed that the distance from the fitting point to the progression end point (the amount of downward pivotal motion of an eyeball) is fixed irrespective of the magnitude of the addition power, the lens can be designed in consideration of the size of the lens itself.

It is preferable that with the position of the fitting point being zero, a side where the distance portion is present being positive with respect to the fitting point, and a side where the near portion is present being negative with respect to the fitting point, the following relationships are satisfied.

$$S \text{ mm} = a \times \text{Add} - b \quad (1)$$

$$3 \leq a \leq 5 \quad (2)$$

$$8 \text{ mm} \leq b \leq 12 \text{ mm} \quad (3)$$

where S represents the position of the progression start point with respect to the fitting point along the principal meridian, Add represents the addition power, and "a" and "b" represent parameters.

In the configuration described above, the position of the progression start point S is determined with respect to the fitting point. As a result, the lens can be designed efficiently under a variety of conditions by separately determining the dioptric power of the distance portion, the dioptric power of the near portion, and the addition power Add and setting the parameters "a" and "b" for each wearer.

It is preferable that a progression start point limiting parameter "c" that limits the position of the progression start point S satisfies the following relationships.

$$-3 \text{ mm} \leq c \leq 0 \text{ mm} \quad (4)$$

$$S \text{ mm} \leq c \quad (5)$$

In the configuration described above, setting the limiting parameter "c", which limits the position of the progression start point S on the principal meridian, allows a progressive-power spectacle lens to be more readily designed.

That is, when the addition power Add is large, the length of the progressive corridor may become too long and the progression end point is not located inside the periphery of the lens or is too close thereto, thus the lens cannot be designed. In the configuration described above, setting the progression start point limiting parameter "c" allows practical lens design to be performed.

It is preferable that when the addition power is equal to or greater than 2.00 dioptre, the position of the progression start point S with respect to the fitting point is set at a fixed value of −2 mm.

In the configuration described above, since a lens is so designed in many cases that the addition power is not greater than 2.00 dioptre, lens design can be performed under this condition.

It is preferable that a limiting parameter "f" that limits the position of the progression start point S satisfies the following relationships.

$$-6 \text{ mm} \leq f \quad (6)$$

$$f \leq S \text{ mm} \quad (7)$$

In the configuration described above, setting the limiting parameter "f", which sets a lower limit of the position of the progression start point S, allows rational lens design to be performed.

BRIEF DESCRIPTION OF THE DRAWINGS

The invention will be described with reference to the accompanying drawings, wherein like numbers refer to like elements.

FIG. 1A is a front view showing a distance portion, a near portion, a progressive portion, and a principal meridian, and FIG. 1B shows a graph illustrating change in addition power along the principal meridian.

FIGS. 2A to 2C show graphs illustrating change in addition power along the principal meridian: FIG. 2A shows a graph for small addition power, FIG. 2B shows a graph for large addition power, and FIG. 2C shows a graph for large addition power with a progression start point located in the distance portion beyond a fitting point.

DESCRIPTION OF EXEMPLARY EMBODIMENTS

Figures 1A, 1B:
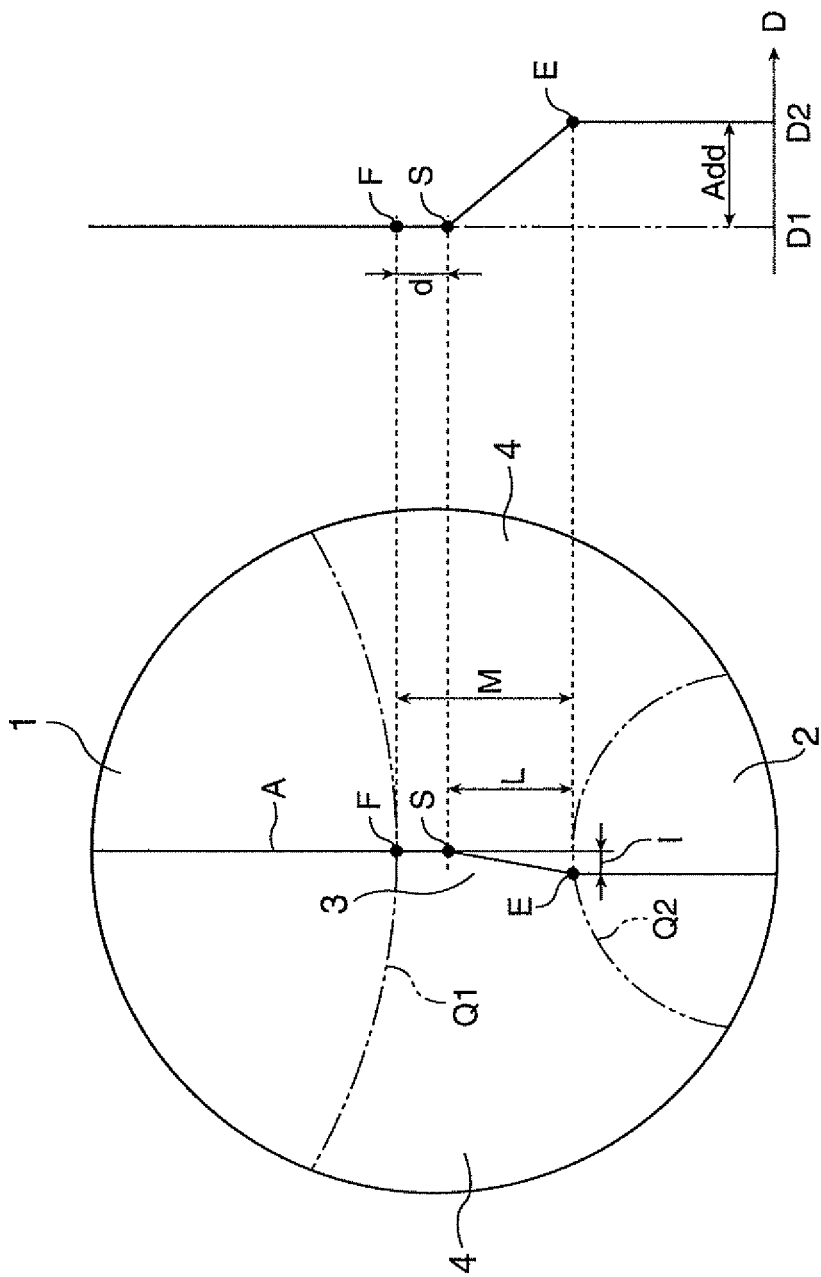
FIGS. 1A and 1B show a progressive-power spectacle lens according to an embodiment of the invention.

Embodiments of the invention will be described below with reference to the drawings.

FIG. 1A is a front view of a progressive-power spectacle lens according to the present embodiment, and FIG. 1B shows a graph illustrating change in power along a principal meridian.

In FIG. 1A, the progressive-power spectacle lens includes a distance portion 1 having power corresponding to distant vision, a near portion 2 having power corresponding to near vision, a progressive portion 3 provided between the distance portion 1 and the near portion 2, and intermediate side portions 4 provided on both sides of the progressive portion 3. In FIG. 1A, the right side is the ear side, and the left side is the nose side.

A boundary line Q1 is drawn along the boundary between the distance portion 1 and the progressive portion 3, and a boundary line Q2 is drawn along the boundary between the progressive portion 3 and the near portion 2.

A principal meridian A is provided from the distance portion 1 through the progressive portion 3 to the near portion 2. The principal meridian A is a collection of positions on the lens through which the line of sight frequently passes when the lens is worn by a wearer. The principal meridian A in the distance portion 1 is provided vertically in a substantially central portion. The principal meridian A in the progressive portion 3 is so set that an upper portion thereof is provided along the principal meridian A provided in the distance portion 1 and the remaining portion is inclined toward the nose. The principal meridian A in the near portion 2 extends in the vertical direction. The principal meridian A provided in the distance portion 1 is parallel to that provided in the near portion 2.

In the near portion 2, the principal meridian A is shifted toward the nose in consideration of convergence that occurs when the wearer views a near object.

The intersection of the principal meridian A and the boundary line Q1 is a fitting point F through which the line of sight passes when the wearer views an object in front thereof. A position located on the principal meridian A and set apart from the fitting point F by a distance d is a progression start point S, and the intersection of the principal meridian A and the boundary line Q2 between the progressive portion 3 and the near portion 2 is a progression end point E. The area between the progression start point S and the progression end point E along the principal meridian A is a progressive surface where addition power continuously changes.

The vertical length between the progression start point S and the progression end point E is the length L of a progressive corridor, and the length between the progression start point S and the progression end point E along the horizontal direction perpendicular to the vertical direction is the amount of inset I.

Along the principal meridian A, the dioptric power is set at D1 from the distance portion 1 to the fitting point F, is also set at D1 from the fitting point F to the progression start point S, increases from D1 to D2 from the progression start point S to the progression end point E, and is set at D2 from the progression end point E to the lower end of the near portion 2, as shown in FIG. 1B.

The difference between the dioptric power D1 and the dioptric power D2 is addition power Add.

A progressive-power spectacle lens design method according to a first embodiment of the invention will be described with reference to FIGS. 2A to 2C.

The dioptric power D1, the dioptric power D2, and the addition power Add are first measured for each wearer, and the distance M from the fitting point F to the progression end point E, that is, the amount of downward pivotal motion of an eyeball of the spectacle wearer, is further determined. The amount of downward pivotal motion is an on-lens travel of the line of sight of the eyeball that pivots downward from a position of the eyeball oriented in the horizontal direction.

Further, the distance d from the fitting point F to the progression start point S along the principal meridian A is determined in accordance with the addition power, as will be described later.

FIG. 2A shows a graph illustrating the change in addition power along the principal meridian for small addition power. FIG. 2B shows a graph illustrating the change in addition power along the principal meridian for large addition power. FIG. 2C shows a graph illustrating the change in addition power along the principal meridian for large addition power with the progression start point S located in the distance portion beyond the fitting point F.

When the addition power Add is small, the progression start point S is set to be far away from the fitting point F so that the distance d is increased and the length L of the progressive corridor is decreased as shown in FIG. 2A, whereas when the addition power Add is large, the progression start point S is set to be close to the fitting point F so that the distance d is decreased and the length L of the progressive corridor is increased as shown in FIG. 2B. When the addition power Add is larger, the progression start point S is located in the distance portion beyond the fitting point F, as indicated by the solid line in FIG. 2C.

In the present embodiment, the distance M from the fitting point F to the progression end point E is fixed irrespective of the magnitude of the addition power Add.

The distance M from the fitting point F to the progression end point E is the sum of the distance d along the principal meridian from the fitting point F to the progression start point S and the length L of the progressive corridor between the progression start point S and the progression end point E: M=d+L.

The distance M typically ranges from approximately 10 to 20 mm although varying from wearer to wearer.

With the position of the fitting point F being zero; the distance-portion side with respect to the fitting point F being positive; the near portion side with respect to the fitting point F being negative; the addition power being Add; and "a" and "b" being parameters, the position of the progression start point S on the principal meridian with respect to the fitting point F is determined by the following conditions.

$$S \text{ mm} = a \times \text{Add} - b \tag{1}$$

$$3 \leq a \leq 5 \tag{2}$$

$$8 \text{ mm} \leq b \leq 12 \text{ mm} \tag{3}$$

The addition power Add is theoretical addition power and ranges, for example, from 0.50 to 3.50 dioptre. The parameters "a" and "b" depend on the wearer and are set as appropriate.

After the progression start point S, the progression end point E, the dioptric power D1 of the distance portion 1, the dioptric power D2 of the near portion 2, the addition power Add, the length L of the progressive corridor, and other conditions necessary for typical lens design are determined, a lens is shaped based on the values described above, and the lens is attached to a frame (not shown). Spectacles are thus completed.

The progressive-power spectacle lens design method according to a second embodiment of the invention will be described with reference to FIG. 2C. The second embodiment differs from the first embodiment in that a limiting parameter "c" that limits the position of the progression start point S is set.

The following equations (4) and (5) are conditions of the limiting parameter "c", which limits the position of the progression start point S set in the second embodiment. The condition expressed in Equation (4) is set in consideration of the size of the lens itself, the addition power Add of the wearer, and other factors.

$$-3 \text{ mm} \leq c \leq 0 \text{ mm} \tag{4}$$

$$S \text{ mm} \leq c \tag{5}$$

When the limiting parameter "c" is set, a progression start point So is located below the fitting point F, and hence the length of the progressive corridor is decreased from L, which is necessary in theory, to Lo, as indicated by the phantom line in FIG. 2C.

The progressive-power spectacle lens design method according to a third embodiment of the invention will be described.

The third embodiment differs from the second embodiment in that a limiting parameter "f" that sets a lower limit of the position of the progression start point S is set.

The following equations (6) and (7) are conditions of the limiting parameter "f", which limits the position of the progression start point S set in the third embodiment. The conditions expressed in Equation (6) and (7) are set in consideration of the size of the lens itself, the addition power Add of the wearer, and other factors.

$$-6 \text{ mm} \leq f \tag{6}$$

$$f \leq S \text{ mm} \tag{7}$$

EXAMPLES

Examples corresponding to the embodiments described above will next be described. In the examples described below, the distance d and the length L of the progressive corridor are set in accordance with the addition power Add, and the other conditions are the same as those in lens design of related art.

Example 1 and 2 corresponding to the first embodiment will be described.

Example 1 corresponds to a wearer whose amount of downward pivotal motion is 14 mm, and "a" and "b" are 4 mm and 10 mm, respectively. Table 1 shows results obtained by substituting the values described above into Equations (1) to (3). Example 1 corresponds to a case where the amount of downward pivotal motion is 14 mm. The progression start point S and the length L of the progressive corridor are determined by substituting addition power determined for each wearer into Table 1.

TABLE 1

| Addition power (Add) (D) | Progression start point S (mm) | Length L of progressive corridor (mm) | Distance M (=d + L) (mm) |
|---|---|---|---|
| 3.50 | 4 | 18 | 14 |
| 3.25 | 3 | 17 | 14 |
| 3.00 | 2 | 16 | 14 |
| 2.75 | 1 | 15 | 14 |
| 2.50 | 0 | 14 | 14 |
| 2.25 | −1 | 13 | 14 |
| 2.00 | −2 | 12 | 14 |
| 1.75 | −3 | 11 | 14 |
| 1.50 | −4 | 10 | 14 |
| 1.25 | −5 | 9 | 14 |
| 1.00 | −6 | 8 | 14 |
| 0.75 | −7 | 7 | 14 |
| 0.50 | −8 | 6 | 14 |

Example 2 is similar to Example 1 and "a" and "b" are 4 mm and 10 mm, respectively. Table 2 shows results obtained by substituting the values described above into Equations (1) to (3). Example 2 corresponds to a wearer whose amount of downward pivotal motion is 15 mm.

TABLE 2

| Addition power (Add) (D) | Progression start point S (mm) | Length L of progressive corridor (mm) | Distance M (=d + L) (mm) |
|---|---|---|---|
| 3.50 | 4 | 19 | 15 |
| 3.25 | 3 | 18 | 15 |
| 3.00 | 2 | 17 | 15 |
| 2.75 | 1 | 16 | 15 |
| 2.50 | 0 | 15 | 15 |
| 2.25 | −1 | 14 | 15 |
| 2.00 | −2 | 13 | 15 |
| 1.75 | −3 | 12 | 15 |
| 1.50 | −4 | 11 | 15 |
| 1.25 | −5 | 10 | 15 |
| 1.00 | −6 | 9 | 15 |
| 0.75 | −7 | 8 | 15 |
| 0.50 | −8 | 7 | 15 |

In Examples 1 and 2, the addition power preferably ranges from 2.25 to 0.50 dioptre (D), but values outside the range can be used when certain conditions are satisfied.

As shown in Example 1, when the addition power Add is small, for example, when the addition power Add is 0.50 dioptre (D), the position of the progression start point S with respect to the fitting point F is −8 mm (distance d is 8 mm) and the length L of the progressive corridor is 6 mm. In contrast, when the addition power Add is large, for example, when the addition power Add is 2.25 dioptre (D), the position of the progression start point S with respect to the fitting point F is −1 mm (distance d is 1 mm) and the length L of the progressive corridor is 13 mm.

As shown in Example 2, when the addition power Add is small, for example, when the addition power Add is 0.50 dioptre (D), the position of the progression start point S with respect to the fitting point F is −8 mm (distance d is 8 mm) and the length L of the progressive corridor is 7 mm. In contrast, when the addition power Add is large, for example, when the addition power Add is 2.25 dioptre (D), the position of the progression start point S with respect to the fitting point F is −1 mm (distance d is 1 mm) and the length L of the progressive corridor is 14 mm.

Further, the distance M from the fitting point F to the progression end point E is fixed, specifically, 14 mm in Example 1 and 15 mm in Example 2, irrespective of the magnitude of the addition power Add.

For a wearer whose amount of downward pivotal motion is 14 mm, the distance d and the length L of the progressive corridor are determined based on Example 1, and for a wearer whose amount of downward pivotal motion is 15 mm, the distance d and the length L of the progressive corridor are determined based on Example 2.

Examples 3 and 4 corresponding to the second embodiment will be described.

Example 3 corresponds to a wearer whose amount of downward pivotal motion is 14 mm, and "a", "b", and "c" are 4 mm, 10 mm, and −2 mm, respectively. Table 3 shows results obtained by substituting the values described above into Equations (1) to (5).

TABLE 3

| Addition power (Add) (D) | Progression start point S (mm) | Length L of progressive corridor (mm) | Distance M (=d + L) (mm) |
|---|---|---|---|
| 3.50 | −2 | 12 | 14 |
| 3.25 | −2 | 12 | 14 |
| 3.00 | −2 | 12 | 14 |
| 2.75 | −2 | 12 | 14 |
| 2.50 | −2 | 12 | 14 |
| 2.25 | −2 | 12 | 14 |
| 2.00 | −2 | 12 | 14 |
| 1.75 | −3 | 11 | 14 |
| 1.50 | −4 | 10 | 14 |
| 1.25 | −5 | 9 | 14 |
| 1.00 | −6 | 8 | 14 |
| 0.75 | −7 | 7 | 14 |
| 0.50 | −8 | 6 | 14 |

Example 4 is similar to Example 3 and "a", "b", and "c" are 4 mm, 10 mm, and −2 mm, respectively. Table 4 shows results obtained by substituting the values described above into Equations (1) to (5). Example 4 corresponds to a wearer whose amount of downward pivotal motion is 15 mm.

TABLE 4

| Addition power (Add) (D) | Progression start point S (mm) | Length L of progressive corridor (mm) | Distance M (=d + L) (mm) |
|---|---|---|---|
| 3.50 | −2 | 13 | 15 |
| 3.25 | −2 | 13 | 15 |
| 3.00 | −2 | 13 | 15 |
| 2.75 | −2 | 13 | 15 |
| 2.50 | −2 | 13 | 15 |

TABLE 4-continued

| Addition power (Add) (D) | Progression start point S (mm) | Length L of progressive corridor (mm) | Distance M (=d + L) (mm) |
|---|---|---|---|
| 2.25 | −2 | 13 | 15 |
| 2.00 | −2 | 13 | 15 |
| 1.75 | −3 | 12 | 15 |
| 1.50 | −4 | 11 | 15 |
| 1.25 | −5 | 10 | 15 |
| 1.00 | −6 | 9 | 15 |
| 0.75 | −7 | 8 | 15 |
| 0.50 | −8 | 7 | 15 |

In Examples 3 and 4, the addition power preferably ranges from 2.00 to 0.50 dioptre (D), but values outside the range can be used when certain conditions are satisfied.

As shown in Example 3, when the addition power Add is small, for example, when the addition power Add is 0.50 dioptre (D), the position of the progression start point S with respect to the fitting point F is −8 mm (distance d is 8 mm) and the length L of the progressive corridor is 6 mm, whereas when the addition power Add is large, for example, when the addition power Add is 1.75 dioptre (D), the position of the progression start point S with respect to the fitting point F is −3 mm (distance d is 3 mm) and the length L of the progressive corridor is 11 mm. Further, when the addition power Add is equal to or greater than 2.00 dioptre (D), the position of the progression start point S with respect to the fitting point F and the length L of the progressive corridor are fixed, specifically, −2 mm (distance d is 2 mm) and 12 mm, respectively.

As shown in Example 4, when the addition power Add is small, for example, when the addition power Add is 0.50 dioptre (D), the position of the progression start point S with respect to the fitting point F is −8 mm (distance d is 8 mm) and the length L of the progressive corridor is 7 mm, whereas when the addition power Add is large, for example, when the addition power Add is 1.75 dioptre (D), the position of the progression start point S with respect to the fitting point F is −3 mm (distanced is 3 mm) and the length L of the progressive corridor is 12 mm. Further, when the addition power Add is equal to or greater than 2.00 dioptre (D), the position of the progression start point S with respect to the fitting point F and the length L of the progressive corridor are fixed, specifically, −2 mm (distance d is 2 mm) and 13 mm, respectively.

Moreover, the distance M from the fitting point F to the progression end point E is fixed, specifically, 14 mm in Example 3 and 15 mm in Example 4, irrespective of the magnitude of the addition power Add.

Examples 5 and 6 corresponding to the third embodiment will be described.

Example 5 corresponds to a wearer whose amount of downward pivotal motion is 14 mm, and "a", "b", "c", and "f" are 4 mm, 10 mm, −2 mm, and −6 mm, respectively. Table 5 shows results obtained by substituting the values described above into Equations (1) to (7).

TABLE 5

| Addition power (Add) (D) | Progression start point S (mm) | Length L of progressive corridor (mm) | Distance M (=d + L) (mm) |
|---|---|---|---|
| 3.50 | −2 | 12 | 14 |
| 3.25 | −2 | 12 | 14 |
| 3.00 | −2 | 12 | 14 |
| 2.75 | −2 | 12 | 14 |
| 2.50 | −2 | 12 | 14 |
| 2.25 | −2 | 12 | 14 |
| 2.00 | −2 | 12 | 14 |
| 1.75 | −3 | 11 | 14 |
| 1.50 | −4 | 10 | 14 |
| 1.25 | −5 | 9 | 14 |
| 1.00 | −6 | 8 | 14 |
| 0.75 | −6 | 8 | 14 |
| 0.50 | −6 | 8 | 14 |

Example 6 is similar to Example 5 and "a", "b", "c", and "f" are 4 mm, 10 mm, −2 mm, and −7 mm, respectively. Table 6 shows results obtained by substituting the values described above into Equations (1) to (7). Example 6 corresponds to a wearer whose amount of downward pivotal motion is 15 mm.

TABLE 6

| Addition power (Add) (D) | Progression start point S (mm) | Length L of progressive corridor (mm) | Distance M (=d + L) (mm) |
|---|---|---|---|
| 3.50 | −2 | 13 | 15 |
| 3.25 | −2 | 13 | 15 |
| 3.00 | −2 | 13 | 15 |
| 2.75 | −2 | 13 | 15 |
| 2.50 | −2 | 13 | 15 |
| 2.25 | −2 | 13 | 15 |
| 2.00 | −2 | 13 | 15 |
| 1.75 | −3 | 12 | 15 |
| 1.50 | −4 | 11 | 15 |
| 1.25 | −5 | 10 | 15 |
| 1.00 | −6 | 9 | 15 |
| 0.75 | −6 | 9 | 15 |
| 0.50 | −6 | 9 | 15 |

In Examples 5 and 6, the addition power preferably ranges from 2.00 to 1.00 dioptre (D), but values outside the range can be used when certain conditions are satisfied.

As shown in Example 5, when the addition power Add is small, for example, when the addition power Add is 1.00 dioptre (D), the position of the progression start point S with respect to the fitting point F is −6 mm (distance d is 6 mm) and the length L of the progressive corridor is 8 mm, whereas when the addition power Add is large, for example, when the addition power Add is 1.75 dioptre (D), the position of the progression start point S with respect to the fitting point F is −3 mm (distance d is 3 mm) and the length L of the progressive corridor is 11 mm. Further, when the addition power Add is equal to or greater than 2.00 dioptre (D), the position of the progression start point S with respect to the fitting point F and the length L of the progressive corridor are fixed, specifically, −2 mm (distance d is 2 mm) and 12 mm, respectively. When the addition power Add is equal to or smaller than 1.00 dioptre (D), the position of the progression start point S with respect to the fitting point F and the length L of the progressive corridor are fixed, specifically, −6 mm (distance d is 6 mm) and 8 mm, respectively.

As shown in Example 6, when the addition power Add is small, for example, when the addition power Add is 1.00 dioptre (D), the position of the progression start point S with respect to the fitting point F is −6 mm (distance d is 6 mm) and the length L of the progressive corridor is 9 mm, whereas when the addition power Add is large, for example, when the addition power Add is 1.75 dioptre (D), the position of the progression start point S with respect to the fitting point F is −3 mm (distance d is 3 mm) and the length L of the progressive corridor is 12 mm. Further, when the addition power Add is equal to or greater than 2.00 dioptre (D), the position of the progression start point S with respect to the fitting point F and the length L of the progressive corridor are fixed, specifically, −2 mm (distance d is 2 mm) and 13 mm, respectively. When the addition power Add is equal to or smaller than 1.00 dioptre (D), the position of the progression start point S with respect to the fitting point F and the length L of the progressive corridor are fixed, specifically, −6 mm (distance d is 6 mm) and 9 mm, respectively.

The distance M from the fitting point F to the progression end point E is fixed, specifically, 14 mm in Example and 15 mm in Example 6, irrespective of the magnitude of the addition power Add.

The present embodiment can therefore provide the following advantageous effects.

1. A progressive-power spectacle lens is so designed that when the addition power Add is large, the distance d along the principal meridian from the fitting point F to the progression start point S is decreased and the length L of the progressive corridor is increased, whereas when the addition power Add is small, the distance d along the principal meridian from the fitting point F to the progression start point S is increased and the length L of the progressive corridor is decreased. As a result, when a person wears a progressive-power spectacle lens for the first time, the field of view around the fitting point F does not include the portion where the dioptric power changes, whereby a wide field of view for distant vision similar to that of a single-vision lens can be provided and hence the wearer will not feel uncomfortable. In contrast, when a person who is in an advanced stage of presbyopia wears the progressive-power spectacle lens, a longer length L of the progressive corridor in accordance with larger addition power Add in the lens design makes the rate of change in addition power moderate and hence the wearer will not experience eye fatigue. In either of the cases described above, since the distance M from the fitting point F to the progression end point E is designed to be fixed irrespective of the magnitude of the addition power Add, the progression end point E will not be located in a peripheral portion of the lens or other disadvantages will not occur.

2. The position of the progression start point S with respect to the fitting point F along the principal meridian is determined from Equations (1) to (3) with the position of the fitting point F being zero, the addition power being Add, and "a" and "b" being parameters. A lens can therefore be designed efficiently under a variety of conditions by setting the addition power Add and the parameters "a" and "b" for each wearer.

3. The limiting parameter "c", which limits the position of the progression start point S along the principal meridian, is set by Equations (4) and (5) in accordance with the condition of the addition power Add, whereby a practically designable progressive-power spectacle lens can be provided.

4. When the addition power Add is equal to or greater than 2.00 dioptre, the position of the progression start point S with respect to the fitting point F is fixed at −2 mm. When a person uses a progressive lens for the first time, the lens is typically so designed that the addition power is not greater than 2.00 dioptre, whereby the lens can be designed in practice under this condition.

5. When the position of the progression start point S is located in a lower portion of a lens, the progression end point E may not be located inside the lower periphery of the lens, which is unrealistic design. To address the problem, the limiting parameter "f", which sets a lower limit of the position of the progression start point S, is set in the present embodiment, whereby rational lens design can be performed.

The invention is not limited to the embodiments described above but encompasses the following variations to the extent that they achieve the advantage of the invention.

For example, the above embodiments have been described with reference to the case where the position of the progression start point S with respect to the fitting point F is determined from Equations (1) to (3), provided that the amount of downward pivotal motion of the wearer is 14 mm or 15 mm. The invention is also applicable to a wearer whose amount of downward pivotal motion differs from the values described above.

The invention is applicable to a progressive-power spectacle lens having a distance portion, a near portion, and a progressive portion.

What is claimed is:

1. A progressive-power spectacle lens design method, the progressive-power spectacle lens including a distance portion, a near portion, and a progressive portion provided between the distance portion and the near portion, a power of the lens changing along a principal meridian between a progression start point provided at a distance-portion-side end of the progressive portion and a progression end point provided at a near-portion-side end of the progressive portion, a position of the progression start point when an addition power is large and a position of the progression start point when the addition power is small being different, the method comprising:

decreasing a distance along the principal meridian from a fitting point to the progression start point and increasing a length of a progressive corridor defined by the progression start point and the progression end point when the addition power is large; and increasing the distance along the principal meridian from the fitting point to the progression start point and decreasing the length of the progressive corridor when the addition power is small, wherein the distance from the fitting point to the progression end point is fixed irrespective of the addition power, and with a position of the fitting point being zero, a side where the distance portion being positive with respect to the fitting point, and a side where the near portion is present being negative with respect to the fitting point, the following relationships are satisfied:

$$S \text{ mm} = a \times \text{Add} - b \tag{1}$$

$$3 \leq a \leq 5 \tag{2}$$

$$8 \text{ mm} \leq b \leq 12 \text{ mm} \tag{3}$$

where S represents the position of the progression start point with respect to the fitting point along the principal meridian, Add represents the addition power, and "a" and "b" represent parameters.

2. The progressive-power spectacle lens design method according to claim 1, wherein a limiting parameter "c" that limits the position of the progression start point S satisfies the following relationships:

$$-3 \text{ mm} \leq c \leq 0 \text{ mm} \tag{4}$$

$$S \text{ mm} \leq c \tag{5}.$$

3. The progressive-power spectacle lens design method according to claim 2, wherein when the addition power is equal to or greater than 2.00 dioptre, the position of the progression start point S with respect to the fitting point is set at a fixed value of −2 mm.

4. The a progressive-power spectacle lens design method according to claim 1, wherein a limiting parameter "f" that limits the position of the progression start point S satisfies the following relationships:

$$-6 \text{ mm} \leq f \quad (6)$$

$$f \leq 5 \text{ mm} \quad (7).$$

* * * * *